United States Patent Office 3,333,003
Patented July 25, 1967

3,333,003
CATALYTIC PROCESS FOR PREPARING $C_{10}Cl_{10}O$ KETONIC, HYDROLYZED REACTION PRODUCT OF HEXACHLOROCYCLOPENTADIENE AND SULFUR TRIOXIDE
Robert J. Du Bois, Morristown, N.J., assignor to Allied Chemical Corporation, New York, N.Y., a corporation of New York
No Drawing. Filed Apr. 22, 1966, Ser. No. 544,388
8 Claims. (Cl. 260—586)

This invention relates to a process for preparing the ketonic hydrolyzed reaction product of hexachlorocyclopentadiene and sulfur trioxide, and more particularly to a process for increasing speed of the reaction and improving the yields and purity of the resulting product.

In U.S. Reissue Patent 24,435 of Everett E. Gilbert and Silvio L. Giolito granted February 25, 1958 (original U.S. Patent 2,616,928 dated November 4, 1952) there is described a process for preparing a biocidally active $C_{10}Cl_{10}O$ ketone and its hydrates by reacting hexachlorocyclopentadiene and sulfur trioxide at temperatures in the range of about 35° C. to about 70° C. to form a reaction product thereof and hydrolyzing the resulting reaction product.

The above ketone product has proved to be of outstanding value in numerous biocidal applications, particularly in the control of ants, roaches and other resistant pests.

The original preparative process of the above reissue patent, while quite satisfactory in most respects often resulted in low yields of ketone product or required long reaction times to produce desired yields, and such long reaction times tended to produce a degraded product, particularly with respect to color and the presence of impurities including inorganic (methanol insoluble) impurities.

It is therefore an object of the present invention to provide a process for preparing the above-described ketonic, hydrolyzed reaction product of hexachlorocyclopentadiene and $SO_3$, wherein higher yields than heretofore achieved are obtained in shorter reaction times.

It is a further object of my invention to provide a process for preparing the ketonic, hydrolyzed reaction product of hexachlorocyclopentadiene and $SO_3$ in a high degree of purity, and characterized particularly by low proportions of inorganic contaminants as reflected in methanol insoluble materials.

These and other objects are accomplished according to my invention wherein hexachlorocyclopentadiene and sulfur trioxide are reacted in the presence of a catalytic amount of an antimony compound. In this way the digestion time, following the admixture of reactants, necessary to obtain high yields of reaction product, is sharply reduced and the product obtained upon hydrolysis of the hexachlorocyclopentadiene adduct is of markedly higher purity than that from the uncatalyzed adduct.

The ketonic, hydrolyzed reaction product of hexachlorocyclopentadiene and sulfur trioxide ($C_{10}Cl_{10}O$) was originally thought to be perchloro-3a,4,7,7a-tetrahydro-4,7-methanoindenenone but is now generally regarded as decachloropentacyclo $[5.3.0.0^{2,6}.0^{3,9}.0^{4,8}]$ decane-one (J. Org. Chem. 27, pages 2704–2705) of the structure

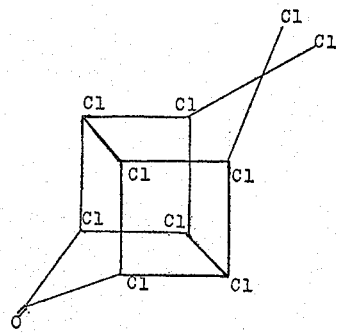

as shown in J. Amer. Chem. Soc. 78, page 1512 (1956).

In carrying out the process according to my invention, hexachlorocyclopentadiene and sulfur trioxide are reacted in the presence of a small, catalytic amount of an antimony compound. For example, the antimony compound may be added either batch-wise or continuously, preferably to the hexachlorocyclopentadiene (HCP). Then sulfur trioxide and the catalyst-containing hexachlorocyclopentadiene can be mixed as by charging them either simultaneously or separately, to a reaction vessel. The reaction mixture is held at reaction temperature (ca. 35°–90° C.) for a short digestion period sufficient to produce the desired high yield of $SO_3$-hexachlorocyclopentadiene reaction product.

In the presence of the antimony catalyst, this digestion period usually is no longer than about 4 hours, and often a period of about one hour's digestion is sufficient to produce desired yields in the region of 85% to 90% calculated as anhydrous $C_{10}Cl_{10}O$, based on the hexachlorocyclopentadiene charged. Longer digestion times do not appear to raise the yields of product significantly and may increase the incidence of impurities in the product. In general, a digestion period between about 1 hour and about 4 hours is adequate for the high yields indicated.

The resulting liquid reaction product is then hydrolyzed, as by drowning in a relatively large volume of aqueous drowning medium, preferably an alkaline medium, for example in at least about 5 volumes of drowning medium per volume of reaction product. Any excess alkalinity can be neutralized if desired, by addition of a small amount of acid such as $H_2SO_4$ to bring the mixture to a pH of about 7–8. A further short digestion period may be provided at this stage to insure completion of the hydrolysis reaction, for example, ¼ to ½ hour. The mixture is then cooled to precipitate the resulting ketonic reaction product as a crystalline solid, which can be recovered from the drowning mixture by mechanical means as by filtration, leaving in solution the salts formed in the neutralization step.

The recovered product may be dried and ground for storage or use. The final product is obtained in hydrate form as a white or light gray solid, usually containing 1 mole of water per mole of ketone.

As brought out above, my improved process is substantially similar to the process of the above reissue patent except for the addition of the antimony catalyst and for the provision of shorter reaction times in the preparation of the hexachlorocyclopentadiene/SO₃ adduct, made possible by the use of this catalyst.

As catalyst in my improved process, any compound of antimony can be used which can be dispersed per se in the hexachlorocyclopentadiene reactant or after solution in water. Both the trivalent and pentavalent forms of antimony are suitable as catalysts.

Antimony compounds which are especially suitable for use as catalyst in my invention include antimony trichloride, antimony pentachloride, antimony trioxide, antimony pentoxide, antimony trifluoride and the antimonic and antimonous acids $HSbO_3$ and $HSbO_2$. Antimony pentachloride is preferred, and I find this compound especially suitable when used in the presence of a small amount of water indicating that reactions may take place to convert at least a portion of the pentachloride to hydrolysis products, possibly including one or more of $Sb_2O_5$, $SbOCl_3$ and $SbOCl$.

A small amount of water, e.g. on the order of 0.1 to 0.2% based on the weight of the antimony pentachloride is usually sufficient to promote hydrolysis and enhance the activity of this catalyst. The amount of water added can be as high as 22% as is apparent from Example 1.

Proportions of antimony compound effective in promoting the HCP-SO₃ reaction are quite small, amounts of as little as about 0.25% or less by weight based on the weight of the HCP being adequate. Quantities in excess of about 1% appear to provide little if any further stimulation of the reaction. In general, amounts of catalyst between about 0.10% and about 0.5% based on the weight of HCP are satisfactory.

The use of antimony catalyst in the hexachlorocyclopentadiene-SO₃ reaction improves the yield of product even when equimolecular quantities of SO₃ are used in the sulfonation reaction. However, I prefer to use an excess of SO₃, for example, about 50% to about 100% excess, to provide maximum yields in the shortest reaction times. In general, therefore, I charge between about 1 mole and about 2 moles of SO₃ per mole of hexachlorocyclopentadiene used, preferably between about 1.5 moles and about 2 moles.

In summary, use of the antimony catalyst in the HCP-SO₃ reaction medium speeds the reaction markedly, requiring significantly shorter digestion times to produce the desired yields of HCP-SO₃ adduct and providing a product of higher purity and better (whiter) color.

The following specific examples further illustrate my invention. Parts are by weight except as otherwise noted.

EXAMPLE 1

(A) Into a 500 ml. flask equipped with agitator, thermometer and water cooled reflux condenser with drying tube, was charged 273 grams (1 mole) of hexachlorocyclopentadiene, 1.35 grams SbCl₅ and 0.3 gram of water. To this charge was added with agitation 128 grams (1.6 moles, i.e. 60% excess) of stabilized liquid sulfur trioxide over a period of 90 minutes at 29° to 64° C. The mixture was digested with agitation for 2½ hours at 64° to 72.5° C. The adduct of HCP-SO₃ thus formed was quenched into 3.5 liters of water containing 330 grams KOH. The excess alkalinity was neutralized with 18 ml. concentrated (96%) H₂SO₄, to pH 7–8. The neutralized mixture was digested at 90–99° C. for ¼ hour, cooled to precipitate hydrolyzed product which was recovered by filtration on a Buchner funnel. The wet filter cake was washed free of inorganic salts with 3.5 liters of water, filtering and washing times were 6 and 18 minutes respectively. The wet cake was oven dried overnight at 94° C. Dry weight of the product was 241 grams. It analyzed 8.7% H₂O and 0.03% methanol insolubles indicating a yield of 89.7 of $C_{10}Cl_{10}O$ calculated as anhydrous product. The product was off-white.

(B) A run carried out in a manner identical to that described above except that no catalyst was used yielded only 217.5 grams of product which analyzed 8.4% water and 0.85% methanol insolubles indicating a gross yield of only 81.1%.

EXAMPLE 2

The procedures of Example 1 (A) and (B) were repeated except that 0.65 gram SbCl₅ and 0.1 gram water was used and 4 hour digestion times were provided with the result that the gross yield of product from the SbCl₅ catalyzed reaction was 89.2% anhydrous basis, with 0.94 methyl alcohol insolubles, the gross yield from the uncatalyzed reaction was 80.3%. It will be noted that yields are substantially the same as those obtained in Example 1 wherein larger amounts of catalyst were used, indicating that yields are not significantly increased by higher percentages of catalyst.

Infrared assays run on the respective products showed the product from the catalyzed run to be 92.2% pure ketone product equivalent to an overall yield of pure product of 82.2%; that from the uncatalyzed run to be 88.4% pure product, equivalent to an overall yield of pure product of only 71.6%.

EXAMPLE 3

The procedures of Example 1 were repeated except that dry SbCl₃ was used as catalyst in place of wet SbCl₅ and digestion times were 2 hours. The yield of ketonic hydrolyzed reaction product of hexachlorocyclopentadiene and SO₃ in the catalyzed run amounted to 216 grams containing 1.52% water and with 0.2% methyl alcohol insolubles providing a yield of 88.3% of a product having a purity of 92.7%. In the uncatalyzed run, the yield of product was 79.7% with 1.17% methyl alcohol insolubles, and a purity of 90.6%.

EXAMPLE 4

The procedures of Example 1 (A) and (B) were repeated except that 160 grams, 2 moles of SO₃ (100% excess) was used in each run; 2.7 grams of Sb₂O₅ was substituted for SbCl₅ as catalyst, and digestion times of 2 hours were employed. The yield of ketonic hydrolyzed reaction product of hexachlorocyclopentadiene and sulfur trioxide obtained in the catalyzed run was 217 grams with 1.07% water and 1.25% methyl alcohol insolubles, providing a yield of 87.5%. The yield obtained in the uncatalyzed run was 82.7% with 1.88% methyl alcohol insolubles.

EXAMPLE 5

The procedures of Example 1 were repeated except that 2 moles of SO₃ (100% excess) were used; 2.7 grams of Sb₂O₃ was used as catalyst in place of SbCl₅ and two hour digestion periods were employed. The catalyzed run produced a yield of 89.2% of ketonic hydrolyzed reaction product of hexachlorocyclopentadiene and SO₃ with a methyl alcohol isoluble content of 0.94%; the uncatalyzed control produced an 84.2% yield with 1.01% of methyl alcohol insoluble impurities.

EXAMPLE 6

The procedures of Example 1 were repeated except that 2.7 grams of SbF₃ were used as catalyst instead of the SbCl₅ employed in Example 1. The reaction mixture was digested for 2 hours to 78° C., hydrolyzed by quenching and recovered by filtration after cooling to 40° C. After drying over the weekend at 86° C., the dried cake weighed 208 grams, equivalent to a yield of 83.1%.

EXAMPLE 7

(A) Into a 500 ml. flask were charged 273 grams (1 mole) of hexachlorocyclopentadiene and 1.35 grams of SbCl₅ (0.5% based on HCP) dispersed in 0.2 gram water. To this charge was added with agitation 80 grams (1 mole) of liquid charge over a 20 minute period during which addition the temperature rose from 30° to 78° C. The reaction mixture was digested with agitation for an additional 3 hours at temperatures between 78° and 96° C.

The HCP-SO$_3$ adduct thus formed was quenched in 3.5 liters of water containing 350 grams of 50% NaOH at 37° to 52° C. The mixture was heated to 99° C. to dissolve the hydrolyzed reaction product. Then 30 ml. of 96% H$_2$SO$_4$ was added to neutralize excess alkalinity. The mixture was digested at 97° C. for ¼ hour, then cooled to 50° C. to precipitate hydrolyzed reaction product. The precipitate was recovered by filtration and washed with 3 liters of water and dried overnight at 102° C. The dry cake weighed 199 grams and contained 1.9% water, providing a yield of 80% on an anhydrous basis. It was very light in color. Infrared assay revealed a purity of 94.2%. Methanol insolubles amounted to 2.0%.

(B) The procedures of part A above were repeated in every respect except that no catalyst was added to the hexachlorocyclopentadiene charge. One mole equivalent SO$_3$ was added to the charge as in part A, and the mixture was digested at temperatures rising to 97° C. for 3 hours. Upon hydrolysis and recovery of the hydrolyzed reaction product as described in part A, 161 grams of a dry cake containing 1.8% water was obtained, equivalent to a yield of 65%. It was darkerd in color than the catalyzed product. Infrared assay revealed a purity of 96.4%. Methanol insolubles amounted to 2.2%.

While the above describes the preferred embodiments of my invention, it will be understood that departures can be made therefrom within the scope of the specification and claims.

I claim:

1. In the process for preparing a ketonic hydrolyzed reaction product of hexachlorocyclopentadiene of empirical formula C$_{10}$Cl$_{10}$O by mixing hexachlorocyclopentadiene and sulfur trioxide at temperatures between about 35° C. and about 90° C. to form a reaction product thereof, and hydrolyzing the reaction product, the improvement which comprises forming the reaction product of hexachlorocyclopentadiene and sulfur trioxide in the presence of a catalytic quantity of an antimony compound selected from trivalent and pentavalent antimony halides, oxides and oxy acids.

2. The process according to claim 1 wherein the catalyst is antimony pentachloride or hydrolysis products thereof.

3. The process according to claim 1 wherein the antimony compounds is antimony pentachloride.

4. The process according to claim 1 wherein the antimony compound is antimony trichloride.

5. The process according to claim 1 wherein the antimony compound is antimony pentoxide.

6. The process according to claim 1 wherein the antimony compound is antimony trioxide.

7. The process according to claim 1 wherein the mole ratio of sulfur trioxide to hexachlorocyclopentadiene charge is between 1.5 and 2.

8. In the process for preparing a ketonic hydrolyzed reaction product of hexachlorocyclopentadiene of empirical formula C$_{10}$Cl$_{10}$O by mixing hexachlorocyclopentadiene and sulfur trioxide at temperatures between about 35° C. and about 90° C. to form a reaction product thereof, and hydrolyzing the reaction product, the improvement which comprises forming the reaction product of hexachlorocyclopentadiene and sulfur trioxide in the presence of between about 0.10% and about 0.5% by weight of antimony pentachloride based on the weight of the hexachlorocyclopentadiene, and between about 0.1% and about 22% by weight of water based on the weight of the antimony pentachloride.

References Cited
UNITED STATES PATENTS

Re. 24,435  2/1958  Gilbert et al. ........ 260—586

LEON ZITVER, *Primary Examiner.*

M. M. JACOB, *Assistant Examiner.*